Feb. 11, 1969 R. J. REDDEN 3,426,397
FABRIC CONNECTOR

Filed May 19, 1967

INVENTOR
ROBERT J. REDDEN
BY
ATTORNEY

Feb. 11, 1969  R. J. REDDEN  3,426,397
FABRIC CONNECTOR
Filed May 19, 1967  Sheet 2 of 2
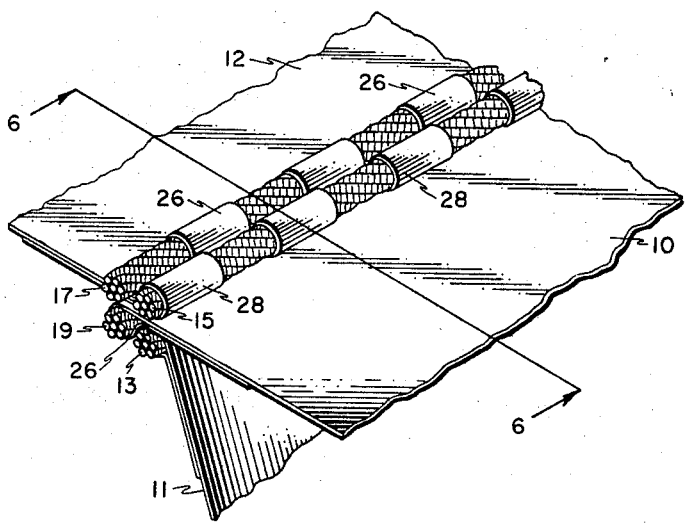
FIG. 4
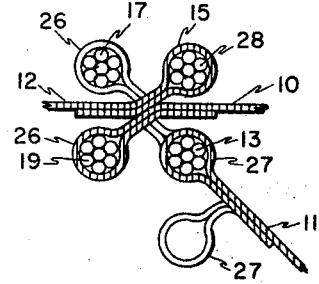
FIG. 6
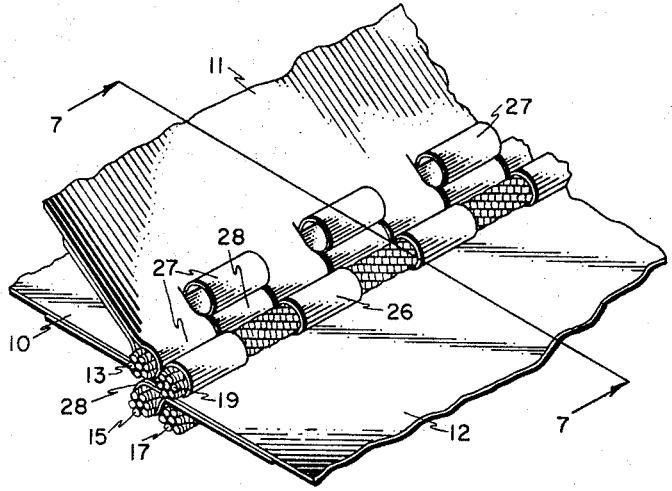
FIG. 5
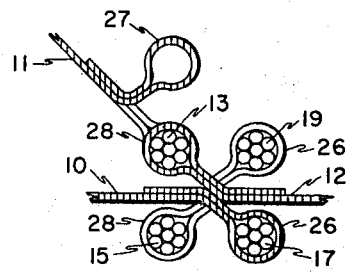
FIG. 7
INVENTOR
ROBERT J. REDDEN
BY
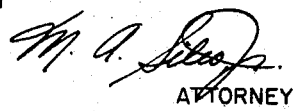
ATTORNEY

United States Patent Office 3,426,397
Patented Feb. 11, 1969

3,426,397
FABRIC CONNECTOR
Robert J. Redden, Dover, Del., assignor to ILC Industries, Inc., Dover, Del., a corporation of Delaware
Filed May 19, 1967, Ser. No. 639,715
U.S. Cl. 24—203                5 Claims
Int. Cl. A44b 21/00; A43c 9/00

ABSTRACT OF THE DISCLOSURE

An improved connector for joining opposite edges of at least two sheets of flexible material, such as adjacent sections of an air-supported structure. Each of the flexible sheets to be joined has adjacent loop members formed on their edges with alternate loop members of one flexible sheet being interdigitated with alternate loop members of the other flexible sheet and positioned on one side of said flexible sheet, and the remaining loop members of the one flexible sheet being interdigitated with the remaining loop members of the other flexible sheet and positioned on the other side of the flexible sheet. Retaining members are respectively threaded through the two sets of interdigitated loop members so as to releasably join together the opposite edges of the flexible sheets.

---

This invention is an improved connector for releasably joining opposite edges of at least two sheets of flexible material.

My invention is preferably applicable to air-supported structures particularly for joining together sections of flexible material that are commonly used in structures of this type. It provides strength characteristics across the connector that are at least equal to the strength characteristics of the flexible material being joined together, and provides relatively low air leakage characteristics.

In air-supported structures such as my invention is applicable to, rapid asembly and disassembly capability is desirable and perhaps the primary reason why air-supported structures are preferred under certain conditions-of-use over ground supported structures. Portability of the structure from one site to another is also a valuable characteristic of air-supported structures.

Designers of air-supported structures have found that rapid assembly and portability are more difficult to achieve as the size of the air-supported structure increases. Longitudinal and transverse sectionalization of the structure is a well known design expedient for reducing the size and weight of the flexible walls that must be transported from site-to-site so as to improve portability characteristics. Sectionalization of air-supported structures, however, caused two major problems, i.e., it complicated assembly and disassembly of the structure at the site, and it increased overall air leakage of the structure at the areas where sections were connected.

My invention in its preferred application permits rapid assembly and disasembly of a sectionalized air-supported structure, yet provides improved strength characteristics across the connector and relatively low air leakage through the connector.

In a preferred embodiment of my invention the edges to be joined together of each section are hemmed, and a plurality of spaced, parallel slots are formed through the hemmed portion of each section normal to its edge. By this construction, a plurality of adjacent loop members are formed across the full length of the section's edge. Alternate loop members of one section are then interdigitated with alternate loop members of another section, such loop members extending from and positioned on one side of the sections to form two co-axial rows of loop members. The remaining loop members of the one section —which are also alternate loop members—are then interdigitated with the remaining loop members of the other section—also alternate loop members—such remaining loop members extending from and positioned on the other side of the sections to form two more rows of co-axial loop members.

Respectively threaded through the co-axial rows of loop members on one side of the sections are a first pair of retaining members, while a second pair of retaining members are threaded through the co-axial rows of loop members on the other side of the sections. When the four retaining members—which may be a continuous member for each row of loop members or a plurality of co-axial members each threaded through at least one loop member in its corresponding row—are threaded through the four rows of loop members an interaction between the retaining and loop members occurs that prevents separation of the members and consequently releasably connects together the edges of the sections.

These and other features, objects and advantages of my invention will be apparent from the following description, reference being made to the accompanying drawings in which like reference numerals are utilized to designate like parts throughout, it being understood that such description and drawings are illustrative and not limitative of my invention.

FIGURES 4 and 5 are perspective views of another embodiment of the fabric connector of the present invention wherein three sheets of fabric are secured together by elongated cables as the retaining members, with the third sheet of fabric extending downward in FIGURE 4 and extending upward in FIGURE 5.

FIGURES 6 and 7 are respectively cross-sectional views of the fabric connector of FIGURES 4 and 5 taken along the lines 6—6 and 7—7 of FIGURES 4 and 5.

Referring now to the figures, two sheets of fabric 10, 12 are connected together by retaining members 14, 16, 18 and 20.

Figure 1:
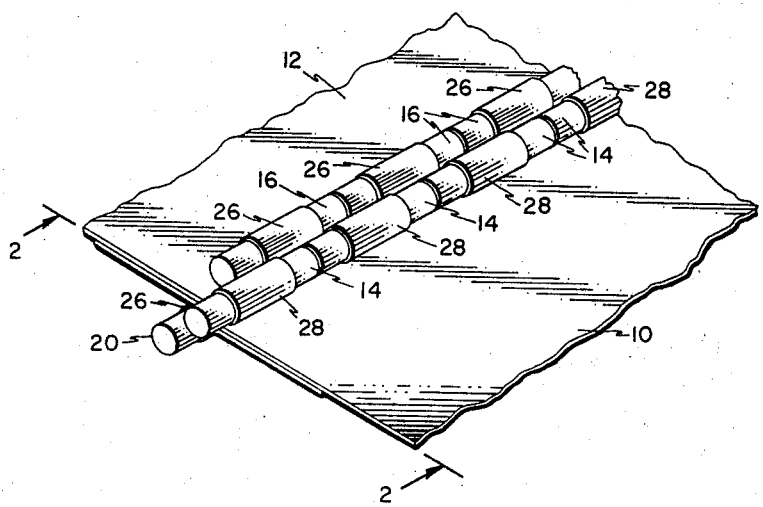
FIGURE 1 is a perspective view of one embodiment of the fabric connector of the present invention wherein two sheets of fabric are secured together by a plurality of relatively short pegs as the retaining members.
Figure 2:
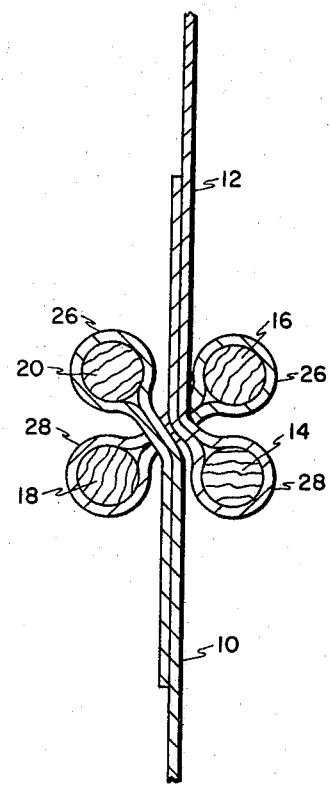
FIGURE 2 is a cross-sectional view of the fabric connector of FIGURE 1 taken along the line 2—2.
Figure 3:
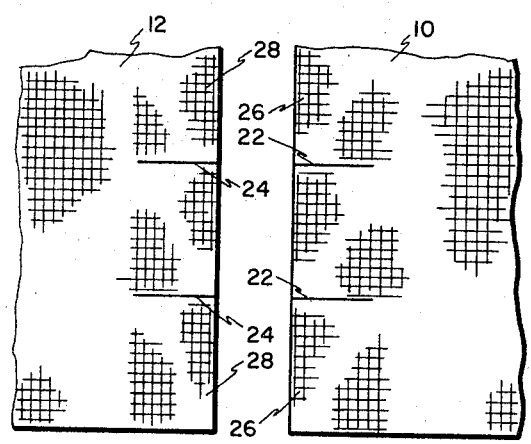
FIGURE 3 is a top plan view of two unconnected sheets of fabric that are constructed in accordance with the present invention.

In the preferred embodiment of my invention, as shown in FIGS. 1–3, the retaining members 14, 16, 18 and 20 are short lengths of rigid pegs, such as wood or metal dowels. It is to be understood at this point that either four continuous flexible cables or cords or longer pegs, such as twice or three times the lengths shown, may be substituted for the plurality of retaining members 14, 16, 18 or 20 shown in FIG. 1 without departing from the spirit and scope of this invention.

The fabric sheets 10, 12 are hemmed as shown in FIGURE 2 and are respectively provided with a plurality of spaced, parallel slots 22, 24, which are respectively normal to the edges of the fabric sheets that are to be connected together. By this construction a plurality of adjacent loop members 26, 28 are respectively formed along the edges to be connected with each loop member being defined by either two successive slots 22 or 24, or by one of the edges not to be connected of the fabric sheets 10, 12 and the first slot spaced therefrom.

Fabric sheets 10, 12 are in an overlapped position when connected so that (1) alternate loop members 26 of the fabric sheet 10 extend over one side of the fabric sheet 12 and form a first row of spaced, co-axial loop members 26, (2) the remaining loop members 26 of the fabric sheet 10 extend over the other side of the fabric sheet 12 and form a second row of spaced, co-axial loop members 26, (3) alternate loop members 28 of fabric sheet 12 extend over one side of the fabric sheet 10 and form a third row of spaced, co-axial loop members 28 which are interdigitated with the first row of loop members 26, and (4) the remaining loop members 28 of fabric sheet 12 extend over the other side of the fabric sheet 10 and form a fourth row of spaced, co-axial loop members 28 which are interdigitated with the second row of loop members 26.

My fabric connector is completed by threading the retaining members 14, 16, 18 and 20 respectively through the rows of loop members.

When the fabric connector is assembled and tension is applied to the fabric sheets 10, 12, the retaining members 14 and 16 on the one side of the fabric sheets 10, 12 prevent the interdigitated loops on that side from separating, while the retaining members 18 and 20 on the other side of the fabric sheets 10, 12 prevent the interdigitated loops on this side from separating. Also, when the fabric sheets are under tension, the inner, overlapping portions of the loop members are compressed together and slightly expanded so as to effectively close-off any gaps between the loop members.

This latter feature of my invention is significant and valuable when this novel technique is used to connect edges of fabric sections of an air-supported structure. I have also determined that the fatigue threshold of my fabric connector is at least equal to the fatigue threshold of the material of the fabric sheets that are being connected, yet this desirable strength characteristic is achieved without the use of reinforcing layers or strips along the edges to be joined.

A preferred method of manufacturing a fabric connector according to my invention is as follows:

(1) Hem the edges of the fabric sheets to be connected. Stitches, adhesives or heat sealing may be used to form the hems.

(2) Cut completely through the hems a plurality of spaced, parallel slots normal to the edges being connected. I have found it preferable to make the slots approximately one-half the desired loop length, or for relatively long loops slightly larger than the desired loop diameter.

(3) Cut rigid round-stock, such as wood or metal dowels, to a length slightly less than twice the desired loop length with a diameter slightly less than the desired loop diameter.

(4) Interdigitate alternate loops of one fabric sheet with alternate loops of the other fabric sheet, positioning such interdigitated loops on one side of the fabric sheets so that two independent rows of spaced, co-axial loops are formed.

(5) Interdigitate the remaining loops of the one fabric sheet with the remaining loops of the other fabric sheet, positioning such interdigitated loops on the other side of the fabric sheet so as to form two more independent rows of spaced, co-axial loops.

(6) Finally, thread one rigid dowel through each loop in each row. Of course, the retaining members may be four continuous cables or cords each threaded through one row of loops, or the rigid dowels may have a length sufficient to extend through two or more loops, as desired.

An alternate method of manufacturing my fabric connector is as follows:

(1) Cut a plurality of spaced, parallel slots in the edge area of the fabric sheets to be connected, such slots being normal to the fabric sheet edges but spaced inwardly of such edges. I have found it preferable to make the slots approximately equal to the desired loop length, or for relatively long loops slightly larger than twice the desired loop diameter.

(2) Fold the edge area so that one-half of each slot is superposed upon its other half.

(3) Hem the folded-over portion of the edge area. Stitches, adhesives or heat sealing may be used to form the hems.

(4) Follow in sequence Steps 3 through 6 of the above described preferred method.

In FIGURES 4 and 5, I show three sheets of fabric secured together in accordance with my invention, two of the fabric sheets are substantially the same as the above described fabric sheets 10, 12 and the third fabric sheet 11 is an additionally connected fabric sheet, which is preferably constructed in the same manner as the fabric sheets 10, 12. Similar elements in FIGURES 4-7 with respect to FIGURES 1-3 are referenced with identical numerals.

The fabric sheet 11 is connected to the fabric sheets 10 and 12 by interdigitating one row of alternate loops 27 of the fabric sheet 11 with one row of alternate loops 28 of fabric sheet 12. In this embodiment of my invention I show the use of elongated cables 13, 15, 17 and 19 as retaining members, such being threaded through the loops 26, 27 and 28 of the fabric sheets 10, 11 and 12 rather than pegs or dowel type retaining members 14, 16, 18 and 20 as shown in FIGURE 1.

It is to be understood that the third fabric sheet 11 may be interdigitated with any row of alternate loops 26 or 28 of the fabric sheets and secured in co-axial alignment therewith by the respective retaining members, i.e., cables 13, 15, 17 or 19 or pegs 14, 16, 18 or 20, with the loops 26 or 28 of any one of the rows of loops of the fabric sheets 10, 12 before the retaining members are inserted. Since only alternate loops 27 of the fabric sheet 11 would be used in this configuration, the remaining loops may be cut off. This, of course, is not necessary since such remaining loops do not mechanically affect the fabric connector and since they could be optionally available for connecting a fourth fabric sheet to the fabric sheet 11, if desired.

In an air-supported structure under certain conditions of use, it is desirable to extend fabric walls inside the structure, such being generally normal to the longitudinal axis of the structure, for compartmentizing and storage purposes, and to extend fabric sheets across the inner ceiling area of the structure for sound absorption and attenuation purposes.

The capability of effectively connecting additional fabric sheets to the original fabric sheets 10, 12 is therefore a valuable feature of my invention, particularly when my fabric connector is used to join segments of an air-supported structure. The fabric connector above described advantageously provides this capability without requiring complex and additional connecting members and without cutting into the outer segments of the air-supported structure.

It will be apparent from the foregoing that my novel fabric connector is simple in construction and inexpensive to manufacture, yet it has desirable strength characteristics and low air leakage capability.

While I have illustrated a presently preferred embodiment of my invention, it will be understood that its teachings, in whole or in part, can be incorporated in many variations.

What is claimed is:

1. A flexible connector for joining opposite edges of a least two sheets of flexible material in which:
   (a) each of the edges to be joined of said flexible sheets has a plurality of spaced slots forming a plurality of adjacent loop members on each of said flexible sheets; and in which
   (b) alternate loop members of one flexible sheet are interdigitated with alternate loop members of the other flexible sheet, with said interdigitated loop members positioned on one side of said flexible sheets to form first and in which second co-axial rows of loop members; and
   (c) the remaining loop members of said one flexible sheet are interdigitated with the remaining loop members of said other flexible sheet, with said latter interdigitated loop members positioned on the other side of said flexible sheets to form third and in which fourth co-axial rows of loop members; and (d) a first pair of retaining members are respectively threaded through said first and second rows of loop members on said one side of said flexible sheets; and in which (e) a second pair of retaining members are respectively threaded through said third and fourth rows of loop members on said other side of said flexible sheets.

2. A flexible connector according to claim 1 in which:
(a) each of said retaining members is a continuous length of flexible cable extending the full length of said sheets.

3. A flexible connector according to claim 1 in which:
(a) each of said retaining members is a plurality of pegs, with each peg being threaded through at least one of the loop members in its corresponding row of loop members.

4. A flexible connector according to claim 1 in which:
(a) each of said retaining members is a plurality of flexible cables, with each cable being threaded through at least one of the loop members in its corresponding row of loop members.

5. A flexible connector according to claim 1 in which:
(a) at least one additional flexible sheet having a plurality of loop members on at least one of its edges is included; and in which
(b) said additional flexible sheet has its loop members interdigitated with one of said co-axial rows of loop members; and in which
(c) the corresponding retaining member is also threaded through said loop members of said additional flexible sheet.

References Cited

UNITED STATES PATENTS

| 1,538,454 | 5/1925 | Trawinski | 24—145 |
| 2,177,585 | 10/1939 | Spear | 24—207 |
| 3,103,050 | 9/1963 | Reitmeier | 24—203 |

BERNARD A. GELAK, *Primary Examiner.*

U.S. Cl. X.R.

24—205.17, 145, 207